(12) United States Patent
Teglia

(10) Patent No.: US 7,325,181 B2
(45) Date of Patent: Jan. 29, 2008

(54) METHOD AND DEVICE FOR SELECTING THE OPERATING MODE OF AN INTEGRATED CIRCUIT

(75) Inventor: Yannick Teglia, Marseilles (FR)

(73) Assignee: STMicroelectronics S.A., Montrouge (FR)

( * ) Notice: Subject to any disclaimer, the term of this patent is extended or adjusted under 35 U.S.C. 154(b) by 766 days.

(21) Appl. No.: 10/784,456

(22) Filed: Feb. 23, 2004

(65) Prior Publication Data

US 2004/0168072 A1 Aug. 26, 2004

(30) Foreign Application Priority Data

Feb. 24, 2003 (FR) .................................. 03 02227

(51) Int. Cl.
*G01R 31/28* (2006.01)
(52) U.S. Cl. ........................ 714/732; 714/45; 713/176; 380/264
(58) Field of Classification Search ..................... None
See application file for complete search history.

(56) References Cited

U.S. PATENT DOCUMENTS

| 4,521,853 | A | | 6/1985 | Guttag | |
| 5,191,608 | A | * | 3/1993 | Geronimi | 713/187 |
| 5,506,396 | A | * | 4/1996 | Asami | 235/492 |
| 6,282,522 | B1 | * | 8/2001 | Davis et al. | 705/41 |
| 7,050,892 | B1 | * | 5/2006 | Liebl et al. | 701/29 |
| 2002/0144121 | A1 | * | 10/2002 | Ellison et al. | 713/176 |
| 2006/0236111 | A1 | * | 10/2006 | Bodensjo et al. | 713/176 |

FOREIGN PATENT DOCUMENTS

DE 197 11 478 A1 10/1998
EP 0 255 414 A1 2/1988

OTHER PUBLICATIONS

French Search Report from French Patent Application 03/02227, filed Feb. 24, 2003.

* cited by examiner

*Primary Examiner*—Cynthia Britt
*Assistant Examiner*—John P Trimmings
(74) *Attorney, Agent, or Firm*—Lisa K. Jorgenson; William R. McClellan; Wolf, Greenfield & Sacks, P.C.

(57) ABSTRACT

A device for selecting an operating mode of an integrated circuit, including a non-volatile memory programmable after manufacturing exhibiting prior to any programming an initial content, means for storing a first signature representative of the initial content of the memory, means for calculating a second signature representative of a current content of the memory, and means for evaluating a difference between the first and second signatures and for deactivating an operating mode selection signal when the difference is greater than a predetermined threshold.

26 Claims, 2 Drawing Sheets

METHOD AND DEVICE FOR SELECTING THE OPERATING MODE OF AN INTEGRATED CIRCUIT

BACKGROUND OF THE INVENTION

1. Field of the Invention

The present invention relates to the selection of an operating mode of an integrated circuit from among several modes, in particular to definitively forbid or select a predetermined operating mode.

2. Discussion of the Related Art

Known integrated circuits include a device for selecting between a reserved mode providing access to all the circuit functionalities, and a user mode providing access to a limited number of the circuit functionalities. Such a device is used, for example, to initially start a circuit in a reserved mode, enabling testing of the circuit and storing of confidential information therein. The selection device can then be locked so that the circuit can only start in a user mode, whereby the stored confidential information cannot be read or modified.

FIG. 1 schematically shows an integrated circuit 2 (IC) intended for a secure application, for example supported by a smart card, and including a functional block 4 (FUNCT). Block 4 provides a control signal COM to an input terminal of a selection device 6 (SELECT) and receives a selection signal SEL from the output terminal of device 6. Device 6 includes a fuse 7 connected between a supply voltage Vdd and the output terminal of device 6, the melting of which is controlled by the reception of an active signal COM. The environment of circuit 2, connected to block 4 by an input/output access 8, is not shown.

Block 4 is configured to operate in the reserved mode if it receives an active signal SEL, that is, as long as fuse 7 has not melted, and in the user mode otherwise. An equivalent system can also use an anti-fuse which closes a circuit to make a function inactive. Signal COM is inactive as long as an operator does not control its activation. Initially, that is, after manufacturing of the circuit, fuse 7 has not melted and block 4 operates in the reserved mode. An operator can test and program block 4 via access 8. Once the testing and the programming of block 4 are complete, the operator controls block 4 to provide an active signal COM to the input terminal of device 6 to melt fuse 7 and cause a definitive selection of the user mode.

Fuse 7 is configured in the integrated circuit so as to forbid a user from reactivating the reserved mode by a keying of signal SEL. Unfortunately, such a fuse may under certain conditions form again after having melted. The non-volatile character of the programming of the state of signal SEL performed by the fuse is then lost.

Further, controlling the melting of a fuse requires a significant power, which requires block 4 or device 6 to include power elements. Such elements increase the circuit size and power consumption.

Moreover, the forming of fuses in an integrated circuit requires certain manufacturing steps, for example, steps of deposition of a tunnel oxide, which are not available in all integrated circuit manufacturing processes, for example, those of integrated circuits with a ferromagnetic memory. It is thus not currently possible to form a circuit with a ferromagnetic memory provided with an operating mode selection device such as in FIG. 1.

SUMMARY OF THE INVENTION

An object of the present invention is to provide a device for selecting the operating mode of an integrated circuit that can be definitively locked and that includes no fuse or anti-fuse exhibiting similar problems.

Another object of the present invention is to provide such a device that takes up reduced surface area.

Another object of the present invention is to provide such a device that has reduced power consumption.

The present invention also aims at an integrated circuit including such a selection device, and at a method for manufacturing such a circuit.

The present invention also aims at a method for selecting the operating mode of an integrated circuit.

To achieve these and other objects, the present invention provides a device for selecting an operating mode of an integrated circuit, comprising:

a non-volatile memory programmable after manufacturing, exhibiting prior to any programming an initial content;

means for storing a first signature representative of the initial content of the memory;

means for calculating a second signature representative of a current content of the memory; and means for evaluating a difference between the first and second signatures and for deactivating an operating mode selection signal when the difference is greater than a predetermined threshold.

According to an embodiment of the present invention, the memory is divided into sub-areas that can each take any one of a plurality of values, the first signature comprises a number of initial occurrences of each of the plurality of values in said sub-areas; and the second signature comprises a number of current occurrences of each of the plurality of values in said sub-areas.

According to an embodiment of the present invention, the means for evaluating the difference between the first and second signatures calculates the differences between the numbers of respective occurrences of each of the plurality of values in the first and second signatures and sums the absolute values of the differences.

The present invention also provides an integrated circuit comprising a selection device, operating in a first mode as long as the operating mode selection signal is active, and in a second mode otherwise.

According to an embodiment of the present invention, at least part of the memory of the selection device is a memory or a memory area which can only be written into in the first operating mode.

According to an embodiment of the present invention, the second signature is calculated each time the circuit is powered on.

The present invention also provides a method for selecting an operating mode of an integrated circuit comprising a non-volatile memory programmable after manufacturing, comprising the steps of:

upon manufacturing of the integrated circuit, storing a first signature representative of the initial content, prior to any programming, of the memory in a storage means; and after manufacturing of the integrated circuit, controllably calculating a second signature representative of a current content of the memory, evaluating a difference between the first and second signatures, and deactivating an operating mode selection signal when the difference is greater than a predetermined threshold.

BRIEF DESCRIPTION OF THE DRAWINGS

The foregoing objects, features, and advantages of the present invention will be discussed in detail in the following non-limiting description of specific embodiments in connection with the accompanying drawings.

DETAILED DESCRIPTION

Figure 1:
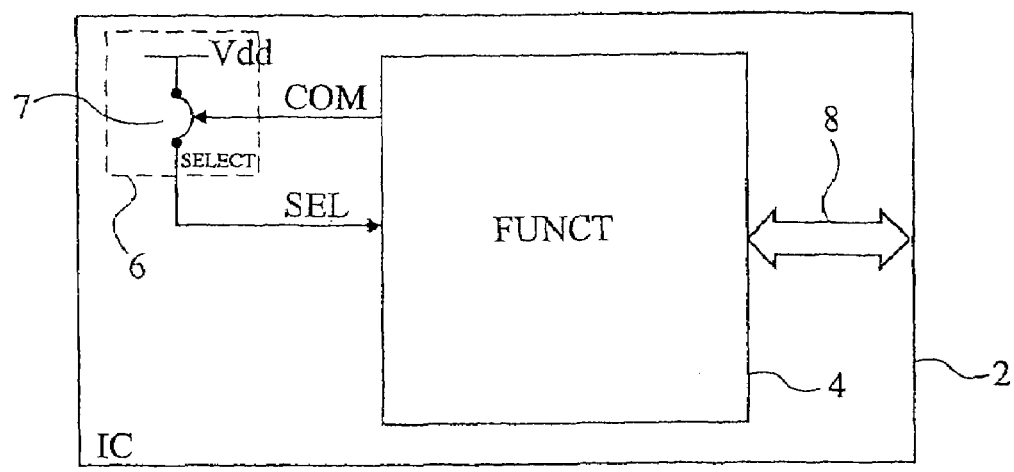
FIG. 1, previously described, schematically shows an integrated circuit provided with a conventional operating mode selection device.

The same elements have been designated with the same reference numerals in the different drawings. Only those elements that are necessary to an understanding of the present invention have been shown.

Figure 2:
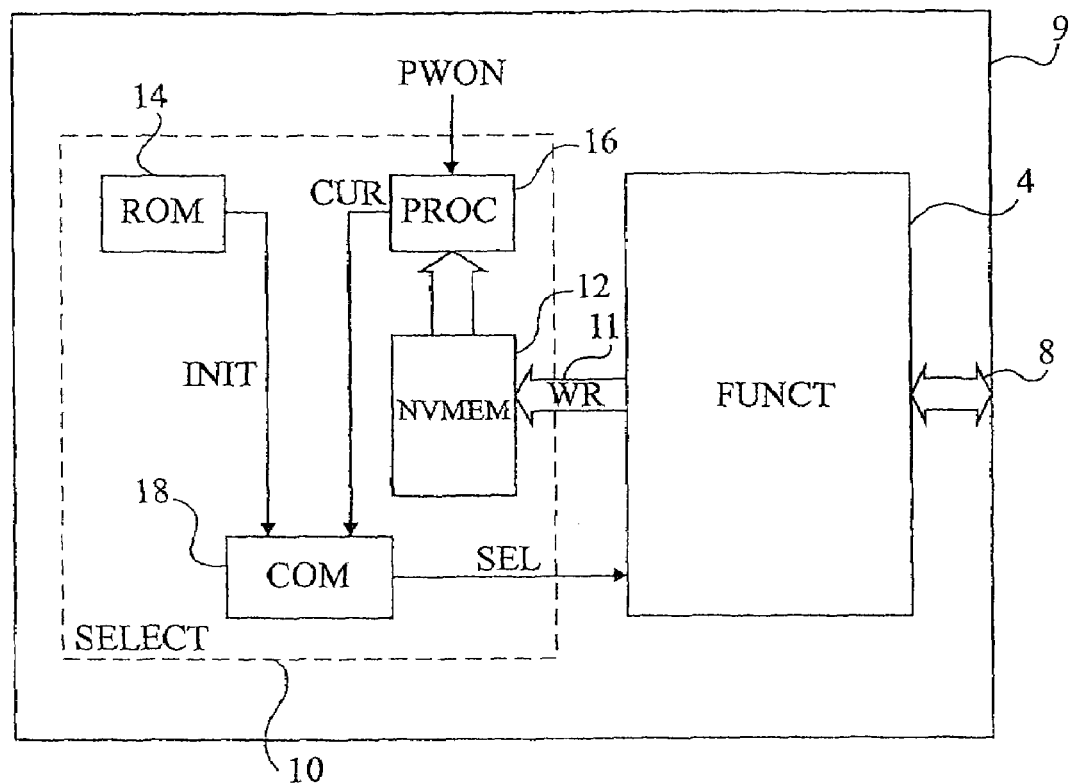
FIG. 2 schematically shows an integrated circuit provided with an operating mode selection device according to an embodiment of the present invention.

FIG. 2 schematically shows an integrated circuit 9 (IC) having a functional block 4 (FUNCT) connected to an environment (not shown) by an input/output access 8. Block 4 is connected by a write bus (WR) to a selection device 10 (SELECT) according to a feature of the present invention, and receives a signal SEL from device 10. According to an embodiment of the present invention, device 10 includes a non-volatile memory 12 (NVMEM) programmable after manufacturing, for example, of FeRAM type, receiving write bus 11. Memory 12 is not a ROM. A storage means such as a ROM 14 stores a first signature INIT representative of an initial content of memory 12, after manufacturing and prior to any programming of memory 12. The way in which the initial content of memory 12 is evaluated is described hereafter. A calculation means 16 (PROC) is arranged to, controllably, read from memory 12 and generate a second signature CUR representative of a current content of memory 12. A control means 18 (COM) is arranged to receive signatures INIT and CUR, to calculate a difference between the two signatures, and to generate a signal SEL which is active as long as the difference is smaller than a predetermined threshold, and inactive otherwise.

Block 4 operates as previously in the reserved mode if it receives an active signal SEL and in the user mode otherwise. As long as no writing into memory 12 has occurred, signature CUR is substantially equal to signature INIT and signal SEL is active. Block 4 thus initially operates in the reserved mode. To select the user mode, an operator can control block 4 to write a predetermined value into memory 12. The predetermined value is chosen so that signature CUR is different (with a predefined tolerance) from signature INIT, and so that control means 18 deactivates signal SEL. For example, calculation means 16 may be controlled to calculate signature CUR upon each powering-on of circuit 9, upon reception of a power-on signal PWON generated by means not shown.

Preferably, block 4 forbids any writing into memory 12 outside of the reserved mode. Thereby, it becomes impossible, once in the user mode, to fraudulently write into memory 12 to modify signature CUR and return to the reserved mode. The user mode selection is thus definitive.

The present invention thus provides a device for selecting the operating mode of a definitively-lockable integrated circuit, which includes no fuse or anti-fuse.

Another advantage of the present invention is that such a device can be formed in any technology enabling manufacturing of non-volatile programmable memories, especially ferromagnetic memories.

Another advantage of the present invention is that such a device requires no power element to melt a possible fuse.

The present invention has been described in relation with an embodiment in which the non-volatile programmable memory is separate from the functional block. However, for practical reasons, the programmable memory of the selection device may be a reserved area of a programmable memory of the functional block. Advantageously, the programmable memory of the selection block may be an area of a programmable memory of the functional block intended to store confidential software or data accessible exclusively in the reserved mode.

According to an alternative embodiment which will be described in relation with FIG. 3, the selection device may also compare signatures INIT and CUR corresponding to the content of the entire programmable memory of the functional block.

Figure 3:
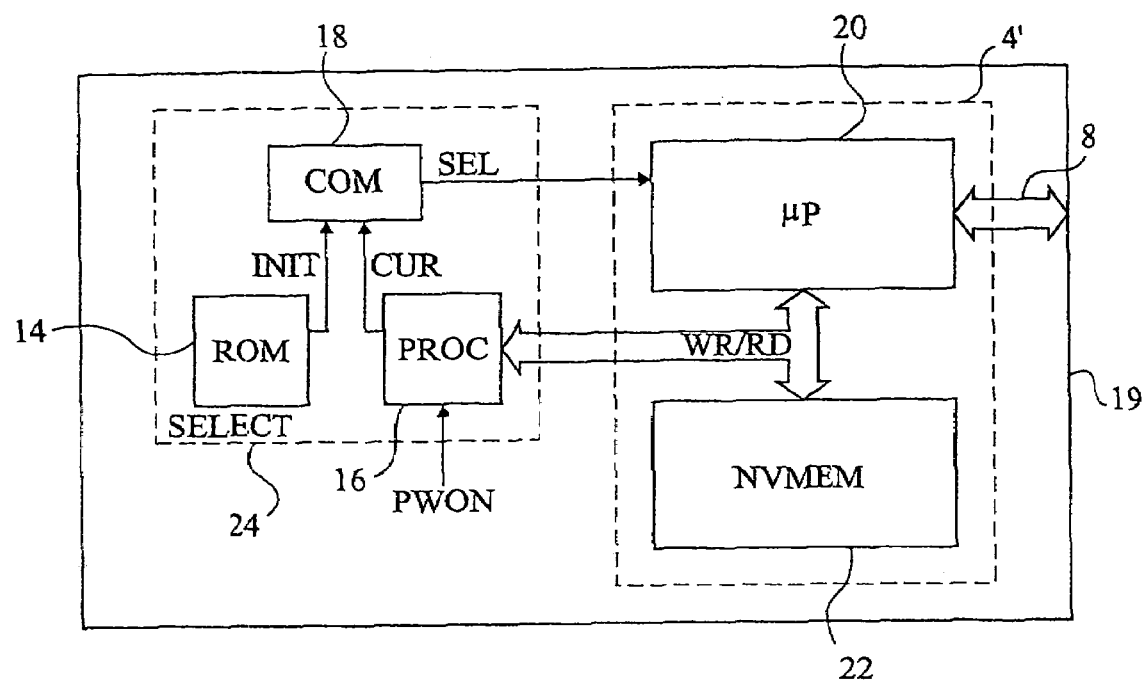
FIG. 3 schematically shows an integrated circuit provided with an operating mode selection device according to an alternative embodiment of the present invention.

In FIG. 3, an integrated circuit 19 (IC) includes a functional block 4' (FUNCT). Block 4' includes a microprocessor 20 (µP) connected by an input/output access 8 to an environment (not shown) and by a write/read bus (WR/RD) to a non-volatile memory 22 (NVMEM) programmable after manufacturing. Block 4', which has substantially the same operation as previous block 4, receives a signal SEL from a selection device 24 (SELECT). According to this alternative, device 24 includes like device 10 of FIG. 2, a read only memory 14, calculation means 16 and control means 18. However, ROM 14 stores a signature INIT representative of the initial content of memory 22, after manufacturing and prior to any programming, and calculation means 16 is connected to bus WR/RD to calculate, controllably, a signature CUR representative of a current content of memory 22.

As long as no writing has occurred into memory 22, signature CUR is substantially equal to signature INIT, signal SEL is active, and block 4 operates in the reserved mode. Any writing into memory 22 results in, at the next powering-on, signature CUR being different from signature INIT. Control means 18 then deactivates signal SEL and block 4 is no longer able to operate in the reserved mode.

As seen previously, memory 22 may include areas accessible in the reserved mode only. Further, the extended size of the content based on which the signatures are calculated makes a fraudulent writing of such a content, which would be likely to generate a signature CUR close to signature INIT, particularly difficult.

The selection device has been shown as including separate calculation means 16 and control means 18. As an alternative, calculation means 16 and control means 18 may be implemented in software form by means of a microprocessor, for example, microprocessor 20 of FIG. 3.

Figure 4:
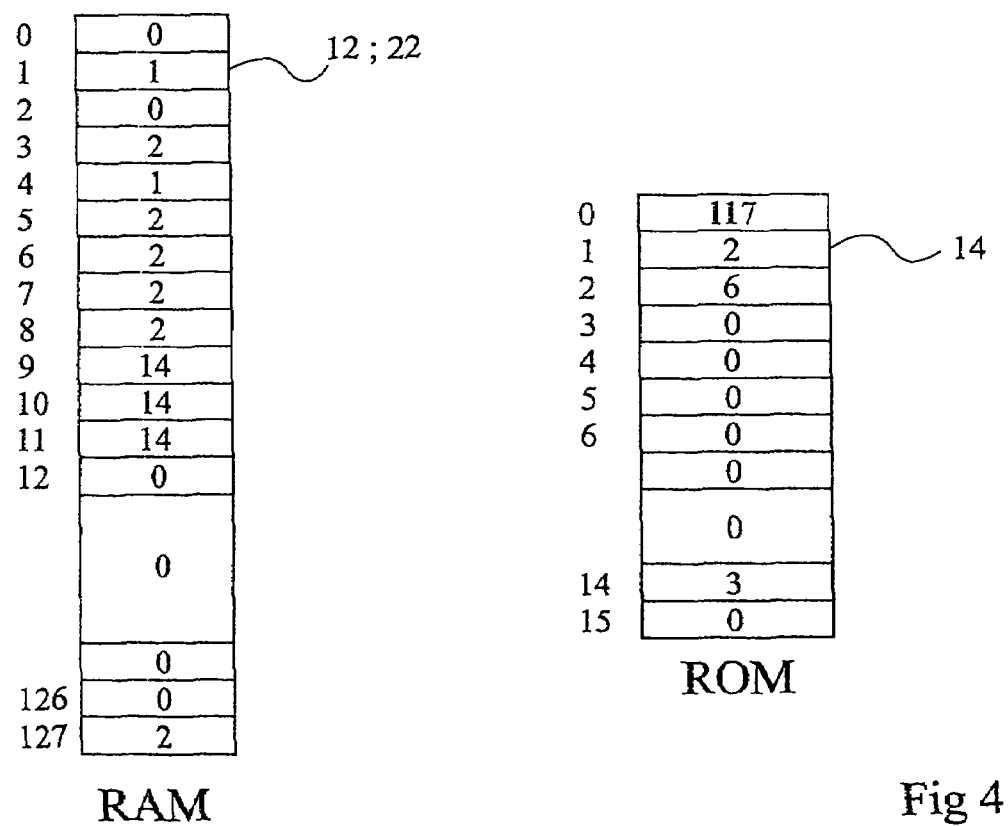
FIG. 4 schematically shows an example of the structure of the programmable memory and of the ROM of an embodiment of a device according to the present invention.

FIG. 4 illustrates an example of an initial content of memory 12 or 22 programmable after manufacturing and of a corresponding content of ROM 14 of the device of FIG. 2 or 3. In the illustrated example, memory 12 is divided into 128 sub-areas or data words of 4 bits that can each take one of sixteen values ranging between 0 and 15. Signature INIT is a set of sixteen values, each respectively corresponding to the number of words of memory 12 initially having one of the sixteen values 0 to 15. In the illustrated example, 2 data words have initial value 1, 6 data words have initial value 2, 3 data words have initial value 14, and the other 117 data words have initial value 0. Signature INIT stored in ROM 14 is, from the lowest rank to the highest rank, the following set of numbers: 117, 2, 6, 0, 0, 0, 0, 0, 0, 0, 0, 0, 0, 0, 3, 0. In practice, memory 12 may include a different number of words having another size and that can each take a plurality of different values. ROM 14 is chosen to store a signature INIT including, preferably, as many numbers as there are different word values. Each number stored in ROM 14 has a maximum value equal to the number of words of memory 12.

Signature CUR is similar to signature INIT. In the illustrated example, signature CUR is a set of sixteen numbers, each corresponding to the number of current words of memory 12 having one of the sixteen values 0 to 15. To calculate signature CUR, calculation means 16 reads the value of each word of memory 12 and counts the number of occurrences of each of the values. According to an embodiment of the present invention, control means 18 calculates the difference between signatures INIT and CUR by subtracting the numbers of same rank of the two signatures, and by adding the absolute values of the different subtractions. The structure of calculation means 16 and control means 18, within the abilities of those skilled in the art, is not described.

The reduced size of signatures INIT and CUR according to the present invention is such that the size of ROM 14 is reduced with respect to the size of memory 12. Similarly, means 16 for calculating signature CUR and control means 18 for processing the signatures may have a relatively simple structure and a reduced size. As a result, selection device 10 or 24 takes up a reduced chip surface area, which is an additional advantage of the present invention.

A specific type of signature, and a specific means for measuring the difference between signatures have been described, but the present invention will readily adapt to any equivalent signature and signature difference measurement. For example, for a programmable memory of reduced size of the selection device, the signature may be equal to the actual content of the memory.

The initial content of memory 12 is determined by various parameters such as the size and the structure of memory 12, as well as the progress of its manufacturing process. It is difficult to predict what the initial content of memory 12 will be before the memory is manufactured. On the other hand, the storage of signature INIT in ROM 14 is conventionally implemented by means of a metallization mask in a so-called ROM programming step. It is thus preferable, to implement the present invention, to measure the initial content of memory 12 during the device manufacturing.

The present invention takes advantage of the fact that after manufacturing, several identical non-volatile programmable memories manufactured on a same wafer (with a same method) substantially have a same initial content.

Thus, according to a feature of the present invention, so-called characterization batches (intended to be subsequently destroyed) are preferably used to statistically determine the initial content of the non-volatile memories. Signature INIT is thus determined and stored in the ROMs of the so-called production batches (intended to be part of the finished products) manufactured by the same process.

In practice, the initial content of each memory 12 of a same batch may be slightly different from the content measured on the reference memory (memories), for example, due to unanticipated manufacturing variations. The threshold of control means 18 is thus preferably selected according to the size, the structure, and the manufacturing process of memory 12 so that such differences do not cause a deactivation of signal SEL.

The evaluation of the initial value of the programmable memories of the circuits of a wafer in one or a few measurements on reference memories is fast and is not likely to damage the circuits, which is an additional advantage of the present invention.

Of course, the present invention is likely to have various alterations, modifications, and improvement which will readily occur to those skilled in the art. In particular, a larger number of operating modes may be provided. The reserved mode may thus be divided into a plurality of reserved sub-modes. As an example, each reserved sub-mode may correspond to a current content signature closer to or more remote from the initial content signature, granting the user rights which are greater as the current content signature is closer to the initial content signature. Further, the user mode may be divided into several operating sub-modes, the selection of which may be conventionally controlled by software or by an activation of specific pins.

Further, the current content signature may be periodically calculated when the circuit is powered.

Moreover, the present invention will readily adapt to any functional block structure having an equivalent operation.

Further, a selection device comparing a plurality of initial content signatures of several memories or memory areas to a corresponding plurality of current content signatures of several memories or memory areas may be provided. A combination of the embodiments of FIGS. 2 and 3 is also within the abilities of those skilled in the art.

In the case where the programmable memory of the device according to the present invention is a memory or memory area which is accessible in the reserved mode only, in which a predetermined value is written to exit the reserved mode, the predetermined value will be selected in any appropriate fashion. As an example, it is possible to calculate this value based on the initial content and to store it in the circuit.

Those skilled in the art will readily adapt the present invention to a device only using a permanently-accessible portion of the programmable memory of the functional block.

Finally, the functional block may implement an additional security level such as an authentication test performed at each powering-on for which signal SEL is active.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for selecting an operating mode of an integrated circuit, comprising:
    a non-volatile memory programmable after manufacturing, having, prior to any programming an initial content;
    means for storing a first signature representative of the initial content of the non-volatile memory;
    means for calculating a second signature representative of a current content of the non-volatile memory; and
    means for evaluating a difference between the first and second signatures and for deactivating an operating mode selection signal when the difference is greater than a predetermined threshold.

2. The device for selecting an operating mode of claim 1, wherein:
the memory is divided into sub-areas that can each take any one of a plurality of values;
the first signature comprises a number of initial occurrences of each of the plurality of values in said sub-areas; and
the second signature comprises a number of current occurrences of each of the plurality of values in said sub-areas.

3. The device for selecting an operating mode of claim 2, wherein the means for evaluating the difference between the first and second signatures calculates the differences between the number of respective occurrences of each of the plurality of values in the first and second signatures and sums the absolute values of the differences.

4. An integrated circuit comprising the device for selecting an operating mode according to claim 1, operating in a first mode as long as the operating mode selection signal is active, and in a second mode otherwise.

5. The integrated circuit of claim 4, wherein at least part of the non-volatile memory of the selection device is a memory or a memory area which can only be written into in the first operating mode.

6. The integrated circuit of claim 4, wherein the second signature is calculated each time the integrated circuit is powered on.

7. A method for selecting an operating mode of an integrated circuit comprising a non-volatile memory programmable after manufacturing, comprising the steps of:
upon manufacturing of the integrated circuit, storing a first signature representative of an initial content, prior to any programming, of the memory in a storage means; and
after manufacturing of the integrated circuit, controllably calculating a second signature representative of a current content of the non-volatile memory, evaluating a difference between the first and second signatures, and deactivating an operating mode selection signal when the difference is greater than a predetermined threshold.

8. A device for selecting an operating mode of an integrated circuit, comprising:
a non-volatile memory having an initial content after manufacturing;
a storage device for storing a first signature representative of the initial content of the non-volatile memory;
a calculation circuit configured to calculate a second signature representative of a current content of the non-volatile memory; and
a control circuit configured to evaluate a difference between the first and second signatures and to deactivate an operating mode selection signal when the difference is greater than a predetermined threshold.

9. A selection device as defined in claim 8, wherein the operating mode selection signal is deactivated in response to writing a predetermined value into the non-volatile memory.

10. A selection device as defined in claim 8, wherein the non-volatile memory comprises a ferromagnetic memory.

11. A selection device as defined in claim 8, wherein the first signature is based on a defined sub-area of the non-volatile memory.

12. A selection device as defined in claim 8, wherein the calculation circuit is configured to calculate the second signature each time the integrated circuit is powered on.

13. A selection device as defined in claim 8, wherein writing in the non-volatile memory is prevented when the operating mode selection signal is deactivated.

14. A selection device as defined in claim 8, wherein the non-volatile memory is divided into sub-areas that can each take any of a plurality of values, the first signature comprises a number of initial occurrences of each of the plurality of values in the sub-areas, and the second signature comprises a number of current occurrences of each of the plurality of values in the sub-areas.

15. The selection device as defined in claim 14, wherein the control circuit is configured to calculate the differences between the number of initial occurrences and the number of current occurrences of each of the plurality of values in the first and second signatures and to sum the absolute values of the differences to obtain a value for comparison with the predetermined threshold.

16. An integrated circuit comprising:
a non-volatile memory having an initial content after manufacturing;
a mode select device for selecting an operating mode of an the integrated circuit, comprising:
a storage device for storing a first signature representative of the initial content of the non-volatile memory;
a calculation circuit configured to calculate a second signature representative of a current content of the non-volatile memory; and
a control circuit configured to evaluate a difference between the first and second signatures and to deactivate an operating mode selection signal when the difference is greater than a predetermined threshold; and
a functional block configured to operate in different operating modes according to a state of the operating mode selection signal.

17. The integrated circuit as defined in claim 16, wherein the functional block is configured to operate in a reserved mode in response to an active state of the operating mode selection signal and to operate in a user mode in response to a deactivated state of the operating mode selection signal.

18. The integrated circuit as defined in claim 16, wherein the non-volatile memory is located in the selection device.

19. The integrated circuit as defined in claim 16, wherein the non-volatile memory is located in the functional block.

20. The integrated circuit as defined in claim 19, wherein the initial content of the non-volatile memory is based on a defined sub-area of the non-volatile memory.

21. The integrated circuit as defined in claim 16, wherein the functional block is configured to prevent writing in the non-volatile memory when the operating mode selection signal is deactivated.

22. A method for selecting an operating mode of an integrated circuit, comprising:
providing on the integrated circuit a non-volatile memory having an initial content after manufacturing;
storing a first signature representative of the initial content of the non-volatile memory;
calculating a second signature representative of a current content of the non-volatile memory; and
evaluating a difference between the first and second signatures and deactivating an operating mode selection signal when the difference is greater than a predetermined threshold.

23. The method as defined in claim 22, further comprising writing a predetermined value into the non-volatile memory to cause the operating mode selection signal to be deactivated.

24. The method as defined in claim 23, wherein writing in the non-volatile memory is prevented when the operating mode selection signal is deactivated.

25. The method as defined in claim 22, wherein the second signature is calculated each time the integrated circuit is powered on.

26. The method as defined in claim 22, wherein the non-volatile memory is divided into sub-areas that can each take any of a plurality of values, the first signature comprises a number of initial occurrences of the plurality of values and the second signature comprises a number of current occurrences of each of the plurality of values, wherein evaluating the difference between the first and second signatures comprises calculating the differences between the number of initial occurrences and the number of current occurrences of each of the plurality of values in the first and second signatures and summing the absolute values of the differences to obtain a value for comparison with the predetermined threshold.

* * * * *

UNITED STATES PATENT AND TRADEMARK OFFICE
CERTIFICATE OF CORRECTION

PATENT NO. : 7,325,181 B2  Page 1 of 1
APPLICATION NO. : 10/784456
DATED : January 29, 2008
INVENTOR(S) : Yannick Teglia It is certified that error appears in the above-identified patent and that said Letters Patent is hereby corrected as shown below:

Col. 8, line 23 should read:
the integrated circuit, comprising:

Signed and Sealed this

Thirteenth Day of May, 2008

JON W. DUDAS
*Director of the United States Patent and Trademark Office*